(12) United States Patent
Sawada

(10) Patent No.: US 11,011,969 B2
(45) Date of Patent: May 18, 2021

(54) SWITCHING CONTROL CIRCUIT, SWITCHING POWER SUPPLY, AND ELECTRIC APPARATUS

(71) Applicant: Rohm Co., Ltd., Kyoto (JP)

(72) Inventor: Akinobu Sawada, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 16/355,993

(22) Filed: Mar. 18, 2019

(65) Prior Publication Data
US 2019/0319527 A1 Oct. 17, 2019

(30) Foreign Application Priority Data

Apr. 11, 2018 (JP) .............................. JP2018-075972

(51) Int. Cl.
*H02M 3/335* (2006.01)
*H02M 1/08* (2006.01)
*H02M 1/00* (2006.01)

(52) U.S. Cl.
CPC .......... *H02M 1/08* (2013.01); *H02M 3/33515* (2013.01); *H02M 3/33523* (2013.01); *H02M 2001/0054* (2013.01)

(58) Field of Classification Search
CPC .............................................. H02M 3/335–42
See application file for complete search history.

(56) References Cited

U.S. PATENT DOCUMENTS

| 2003/0128555 A1* | 7/2003 | Schemmann ....... H02M 3/3385 363/16 |
| 2006/0082394 A1* | 4/2006 | Briskin .................... H03K 5/13 327/77 |
| 2008/0007237 A1* | 1/2008 | Nagashima ........... H02M 3/156 323/283 |
| 2010/0315148 A1* | 12/2010 | Zhu ...................... H03K 5/1565 327/298 |
| 2014/0268951 A1* | 9/2014 | Wang ...................... H02M 7/12 363/78 |
| 2016/0268901 A1* | 9/2016 | Nishijima ............... H02M 1/44 |
| 2019/0181859 A1* | 6/2019 | Wibben ............. H03K 17/6871 |

FOREIGN PATENT DOCUMENTS

JP    2008-245419    10/2008

* cited by examiner

*Primary Examiner* — Thienvu V Tran
*Assistant Examiner* — Peter M Novak
(74) *Attorney, Agent, or Firm* — Fish & Richardson P.C.

(57) ABSTRACT

There is provided a configuration of a switching control circuit for use with a switching power supply which generates an output voltage from an input voltage, the switching control circuit having an intermittent operation mode where an operation period in which a switching element of the switching power supply is switched and a pause period in which the switching element is not switched are repeated. The switching control circuit includes a prohibition part configured to prohibit starting a next operation period until a predetermined period of time elapses from a time that a current operation period starts, in the intermittent operation mode.

11 Claims, 9 Drawing Sheets

SWITCHING CONTROL CIRCUIT, SWITCHING POWER SUPPLY, AND ELECTRIC APPARATUS

CROSS-REFERENCE TO RELATED APPLICATION

This application is based upon and claims the benefit of priority from Japanese Patent Application No. 2018-075972, filed on Apr. 11, 2018, the entire contents of which are incorporated herein by reference.

TECHNICAL FIELD

The present disclosure relates to a switching control circuit for use with a switching power supply, the switching power supply, and an electric apparatus.

BACKGROUND

In a switching power supply, since switching loss becomes significant at a light load, reducing the number of times of switching at such light load is effective in improving efficiency. Therefore, various switching power supplies having an intermittent operation mode at a light load have been developed such that an operation period in which a switching element is switched and a pause period in which the switching element is not switched are repeated.

In the switching power supplies of the related art, the operation period and the pause period in the intermittent operation mode are switched based on a result of comparison between a feedback voltage corresponding to an output voltage supplied to a load and a threshold value. Therefore, in such switching power supplies, there is a case where the operation period appears in a short period in the intermittent operation mode, which may result in insufficient efficiency.

SUMMARY

Some embodiments of the present disclosure provide a switching control circuit capable of reliably and sufficiently increasing efficiency at a light load.

According to one embodiment of the present disclosure, there is provided a configuration (a first configuration) of a switching control circuit for use with a switching power supply which generates an output voltage from an input voltage, the switching control circuit having an intermittent operation mode where an operation period in which a switching element of the switching power supply is switched and a pause period in which the switching element is not switched are repeated. The switching control circuit includes a prohibition part configured to prohibit starting a next operation period until a predetermined period of time elapses from a time that a current operation period starts, in the intermittent operation mode.

According to another embodiment of the present disclosure, there is provided a configuration (a second configuration), for the switching control circuit of the first configuration, that the predetermined period of time is 4 ms or longer.

According to another embodiment of the present disclosure, there is provided a configuration (a third configuration), for the switching control circuit of the first configuration or the second configuration, that a maximum switching frequency of the switching element is 60 kHz or higher.

According to another embodiment of the present disclosure, there is provided a configuration (a fourth configuration), for the switching control circuit of the first configuration to the third configuration, further including a terminal to which a passive element is externally connected, wherein the predetermined period of time varies depending on a circuit constant of the passive element.

According to another embodiment of the present disclosure, there is provided a configuration (a fifth configuration), for the switching control circuit of the fourth configuration, further including a constant current source, wherein the passive element is a capacitor charged with a constant current output from the constant current source.

According to another embodiment of the present disclosure, there is provided a configuration (a sixth configuration), for the switching control circuit of the fourth configuration, further including a capacitor and a current mirror circuit configured to supply a current to each of the capacitor and the passive element, wherein the passive element is a resistor.

According to another embodiment of the present disclosure, there is provided a configuration (a seventh configuration), for the switching control circuit of the fifth configuration or the sixth configuration, that the predetermined period of time is a period of time from the time charging of the capacitor is started until a charging voltage of the capacitor reaches a predetermined value.

According to another embodiment of the present disclosure, there is provided a configuration (an eighth configuration) of a switching power supply including: the switching element and the switching control circuit of one of the first configuration to the seventh configuration, wherein the switching control circuit is configured to control switching of the switching element.

According to another embodiment of the present disclosure, there is provided a configuration (a ninth configuration) of an electric apparatus including the switching power supply of the eighth configuration.

DETAILED DESCRIPTION

<1. Example of Overall Configuration of Switching Power Supply>

Figure 1:
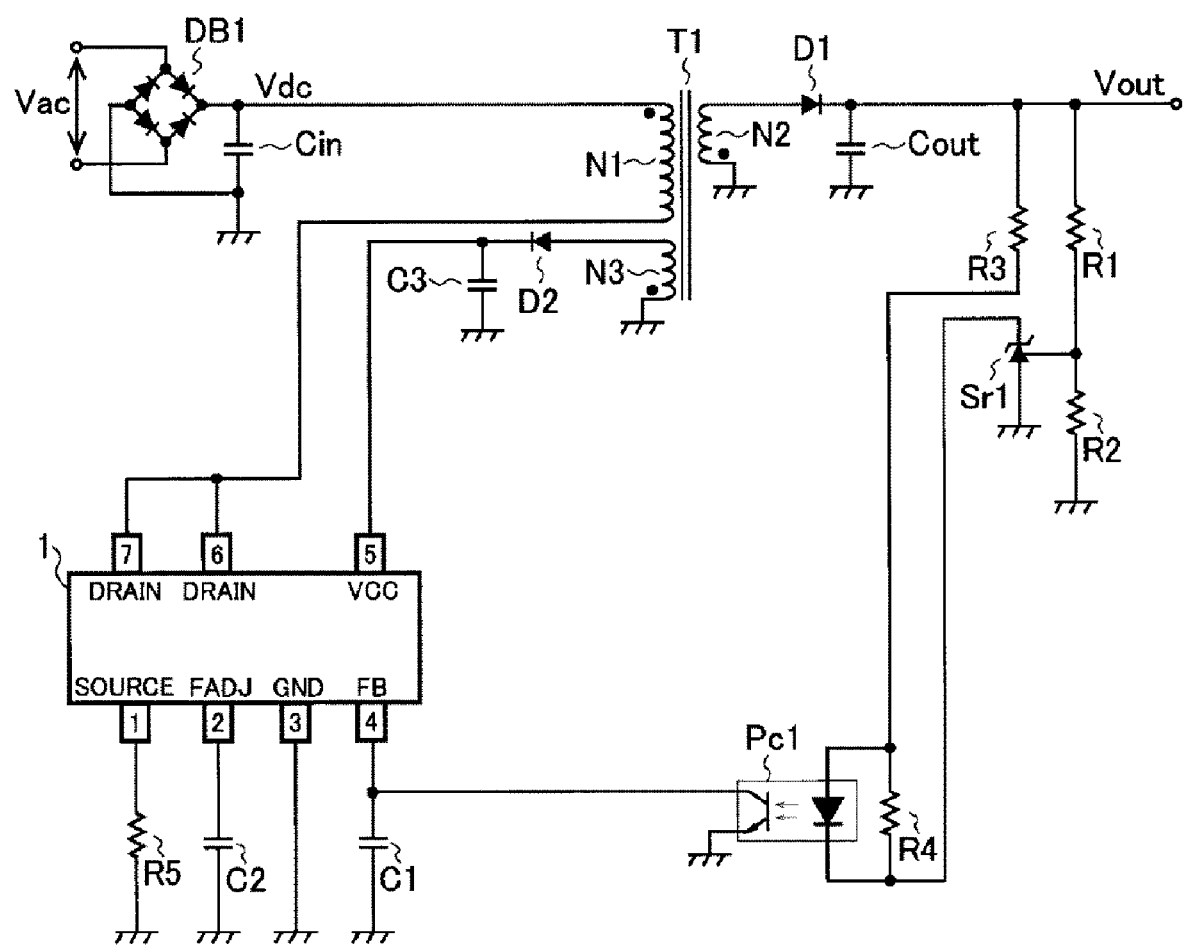
FIG. 1 is a view showing an example of the overall configuration of a switching power supply device.

FIG. 1 is a view showing an example of an overall configuration of a switching power supply. The switching power supply shown in FIG. 1 is a power supply device having a fly-back type converter and mainly includes a diode bridge DB1, an input capacitor Cin, a transformer T1, an output capacitor Cout, and a switching control IC (Integrated Circuit) 1.

The diode bridge DB1 performs full-wave rectification of an AC voltage Vac such as a commercial AC power supply voltage. The input capacitor Cin smoothes a pulsating voltage output from the diode bridge DB1 to generate a DC voltage Vdc.

The transformer T1 includes a primary winding N1, a secondary winding N2, and an auxiliary winding N3.

The DC voltage Vdc is applied to one end of the primary winding N1. The sixth terminal and the seventh terminal of the switching control IC 1 are connected to the other end of the primary winding N1.

One end of the output capacitor Cout, one end of a resistor R3, one end of a resistor R1, and an output terminal are connected to one end of the secondary winding N2 via a diode D1. The other end of the secondary winding N2 and the other end of the output capacitor Cout are grounded.

The other end of the resistor R1 is grounded via a resistor R2. The other end of the resistor R3 is connected to one end of a shunt regulator Sr1 via a resistor R4. The other end of the shunt regulator Sr1 is grounded.

The resistors R1 and R2 divide an output voltage Vout of the switching power supply shown in FIG. 1. The shunt regulator Sr1 amplifies an error between a divided voltage of the output voltage Vout and a predetermined reference voltage, and outputs a current corresponding to the error. A light emitting diode on the input side of a photocoupler Pc1 is disposed on a path through which the output current of the shunt regulator Sr1 flows. The photocoupler Pc1 outputs a feedback voltage Vfb corresponding to the error between the divided voltage of the output voltage Vout and the predetermined reference voltage to the fourth terminal of the switching control IC 1. The resistors R3 and R4 are provided to appropriately bias the light emitting diode of the photocoupler Pc1.

The fourth terminal of the switching control IC 1 is grounded via a capacitor C1. The capacitor C1 is provided for the purpose of phase compensation.

The third terminal of the switching control IC 1 is grounded. The second terminal of the switching control IC 1 is grounded via a capacitor C2. The first terminal of the switching control IC 1 is grounded via a resistor R5. The resistor R5 is a resistor for detecting a current flowing through a switching element in the switching control IC 1.

One end of a capacitor C3 and the fifth terminal of the switching control IC 1 are connected to one end of the auxiliary winding N3 via a diode D2. The other end of the auxiliary winding N3 and the other end of the capacitor C3 are grounded.

<2. Configuration Example and Operation Example of Switching Control IC>

Figure 2:
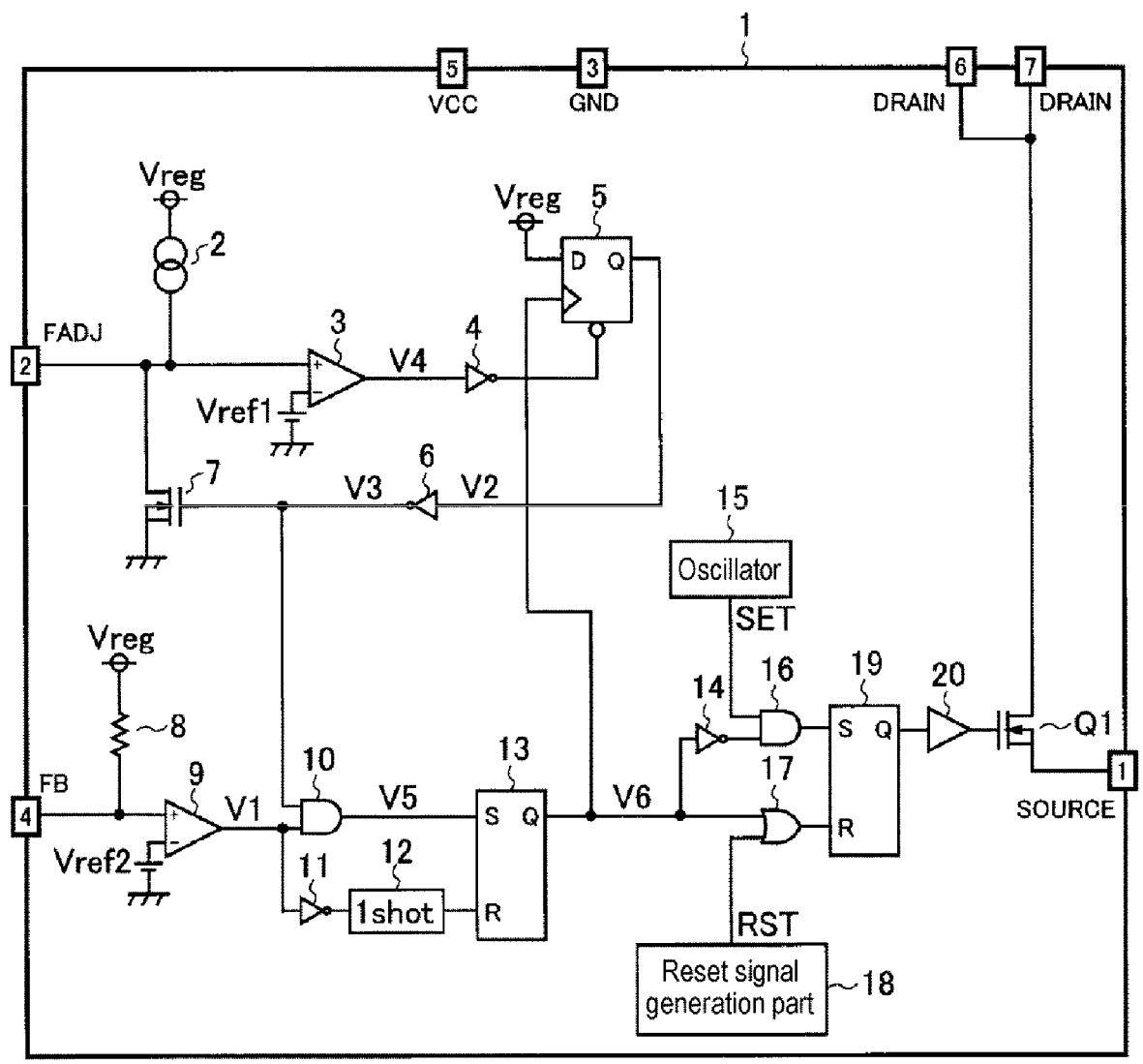
FIG. 2 is a view showing a configuration example of a switching control circuit.
Figure 3:
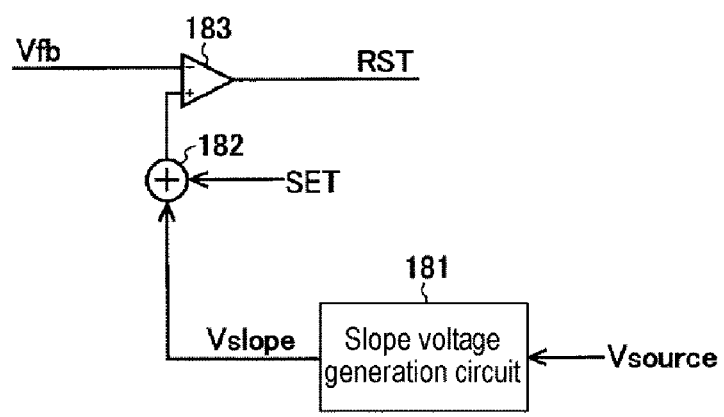
FIG. 3 is a view showing a configuration example of a reset signal generation part.
Figure 4:
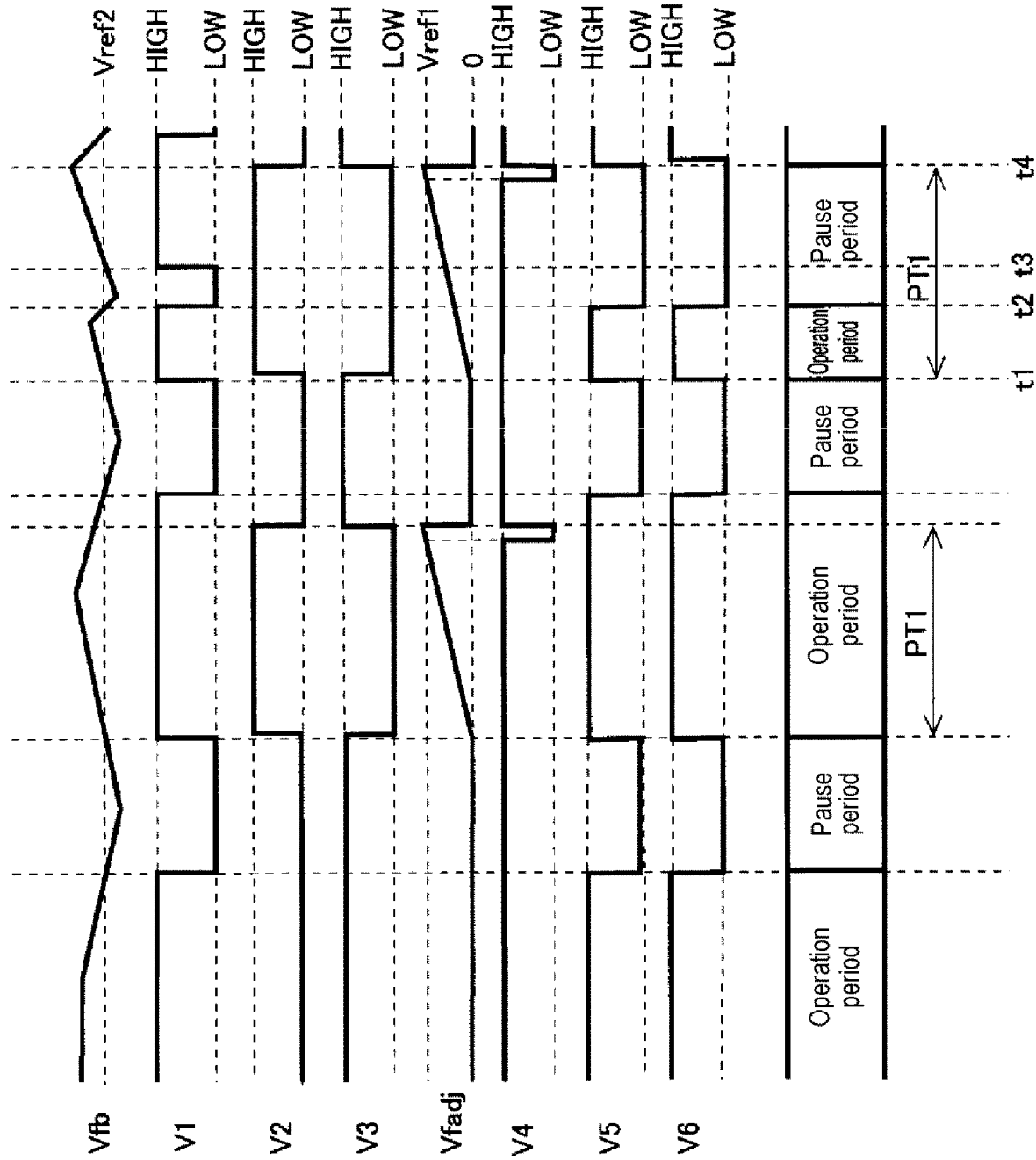
FIG. 4 is an operation waveform diagram in an intermittent operation mode.

FIG. 2 is a view showing a configuration example of the switching control IC 1. FIG. 3 is a view showing a configuration example of a reset signal generation part. FIG. 4 is an operation waveform diagram in an intermittent operation mode. A voltage Vsource in FIG. 3 is a voltage applied to the first terminal of the switching control IC 1, a voltage Vfb in FIG. 4 is a voltage applied to the fourth terminal of the switching control IC 1, and a voltage Vfadj in FIG. 4 is a voltage applied to the second terminal of the switching control IC 1.

In the configuration example shown in FIG. 2, the switching control IC 1 includes a constant current source 2, a comparator 3, a NOT gate 4, a D flip-flop 5, a NOT gate 6, and a discharging switch 7. The discharging switch 7 is an N-channel MOS transistor.

In the configuration example shown in FIG. 2, the switching control IC 1 further includes a pull-up resistor 8, a comparator 9, an AND gate 10, a NOT gate 11, a one-shot circuit 12, an SR flip-flop 13, a NOT gate 14, an oscillator 15, an AND gate 16, an OR gate 17, a reset signal generation part 18, an SR flip-flop 19, a driver 20, and a switching element Q1. The switching element Q1 is an N-channel MOS transistor. Different from the configuration example shown in FIG. 2, the switching element Q1 may be provided outside the switching control IC 1.

The switching control IC 1 is driven by a voltage applied to the fifth terminal. The switching control IC 1 generates constant voltages such as an internal power supply voltage Vreg, a first reference voltage Vref1, a second reference voltage Vref2, and the like from the voltage applied to the fifth terminal.

The constant current source 2 supplies a constant current to the capacitor C2 (see FIG. 1) connected to the second terminal of the switching control IC 1 to charge the capacitor C2.

The comparator 3 compares the voltage Vfadj (corresponding to a charging voltage of the capacitor C2) applied to the second terminal of the switching control IC 1 with the first reference voltage Vref1, and outputs a voltage V4, which is a result of the comparison, to the NOT gate 4. The NOT gate 4 logically inverts the voltage V4 and supplies it to the clear terminal of the D flip-flop 5.

The internal power supply voltage Vreg is supplied to the data terminal of the D flip-flop 5. A voltage V6 to be described later is supplied to the clock terminal of the D flip-flop 5. A voltage V2 output from the output terminal of the D flip-flop 5 is logically inverted by the NOT gate 4 to be converted into a voltage V3.

The voltage V3 is supplied to the gate of the discharging switch 7 and the first input terminal of the AND gate 10. When the discharging switch 7 is turned on, charges stored in the capacitor C2 are discharged to reset the capacitor C2.

The pull-up resistor 8 pulls up the fourth terminal of the switching control IC 1 to the internal power supply voltage Vreg. The comparator 9 compares the feedback voltage Vfb applied to the fourth terminal of the switching control IC 1 with the second reference voltage Vref2 and supplies a voltage V1, which is a result of the comparison, to the second input terminal of the AND gate 10 and the input terminal of the NOT gate 11.

The AND gate 10 supplies the logical product of the voltage V3 and the voltage V1 to the set terminal of the SR flip-flop 13. The NOT gate 11 logically inverts the voltage V1 and supplies it to the one-shot circuit 12. In response to the edge of the voltage V1, the one-shot circuit 12 generates a pulse signal having a predetermined pulse width, and supplies it to the reset terminal of the SR flip-flop 13.

The voltage V6 output from the output terminal of the SR flip-flop 13 is supplied to the clock terminal of the D flip-flop 5 as described above and is also supplied to the input terminal of the NOT gate 14 and the first input terminal of the OR gate 17.

The NOT gate 14 logically inverts the voltage V6 and supplies it to the second input terminal of the AND gate 16. The oscillator 15 supplies a set signal SET, which is a 65 kHz clock signal, to the first input terminal of the AND gate 16. The AND gate 16 supplies the logical product of the logic inverted signal of the voltage V6 and the set signal SET to the set terminal of the SR flip-flop 19.

The reset signal generation part 18 supplies a reset signal RST to the second input terminal of the OR gate 17. The OR gate 17 supplies the logical sum of the voltage V6 and the reset signal RST to the reset terminal of the SR flip-flop 19.

As shown in FIG. 3, the reset signal generation part 18 includes a slope voltage generation circuit 181, an adder 182, and an error amplifier 183. The slope voltage generation circuit 181 generates a slope voltage Vslope having a slope corresponding to the voltage Vsource applied to the first terminal of the switching control IC 1. The voltage Vsource applied to the first terminal of the switching control IC 1 is a voltage corresponding to a current flowing through the switching element Q1. The adder 182 adds the slope voltage Vslope and the set signal SET, and supplies a result of the addition to the non-inverting input terminal of the error amplifier 183. The feedback voltage Vfb is supplied to the inverting input terminal of the error amplifier 183. An output signal of the error amplifier 183 serves as the reset signal RST. Since the reset signal generation part 18 generates the reset signal RST based on the current flowing through the switching element Q1, the switching power supply shown in FIG. 1 is a current mode-controlled switching power supply. The configuration of the reset signal generation part 18 may be changed so that the switching power supply shown in FIG. 1 becomes a voltage mode-controlled switching power supply.

Returning to FIG. 2, a voltage output from the output terminal of the SR flip-flop 19 is amplified by the driver 20 and is supplied to the gate of the switching element Q1. The drain of the switching element Q1 is connected to the sixth terminal and the seventh terminal of the switching control IC1, and the source of the switching element Q1 is connected to the first terminal of the switching control IC 1.

As shown in FIG. 4, when the feedback voltage Vfb exceeds the second reference voltage Vref2, the voltage V1 is switched from a low level to a high level to start an operation period (see time t1 in FIG. 4). Thereafter, when the feedback voltage Vfb becomes lower than the second reference voltage Vref2, the voltage V1 is switched from the high level to the low level to switch from the operation period to a pause period (see time t2 in FIG. 4). Then, at the point of time when the feedback voltage Vfb exceeds the second reference voltage Vref2 next (time t3 in FIG. 4), when a predetermined period of time PT1 has not elapsed from the point of time when the previous feedback voltage Vfb exceeded the second reference voltage Vref2 (time t1 in FIG. 4), the pause period in which the logical inversion of the voltage V1 is masked by the voltage V3 continues until the predetermined period of time PT1 elapses (for a period from time t3 to time t4 in FIG. 4).

That is, in the intermittent operation mode, the start of the next operation period is prohibited until the predetermined period of time PT1 elapses from the time the operation period (a current operation period) starts. This eliminates a possibility of the operation period appearing in a short cycle in the intermittent operation mode. As a result, efficiency at a light load can be reliably and sufficiently increased. A circuit including the constant current source 2, the comparator 3, the NOT gate 4, the D flip-flop 5, the NOT gate 6, the discharging switch 7, and the AND gate 10 serves as a prohibition part that prohibits the start of the next operation period until the predetermined period of time PT1 elapses from the time the operation period in the intermittent operation mode starts. The predetermined period of time PT1 is a period of time from the time the charging of the capacitor C2 is started until the charging voltage (corresponding to the voltage Vfadj) of the capacitor C2 reaches the first reference voltage Vref1.

Figure 5:
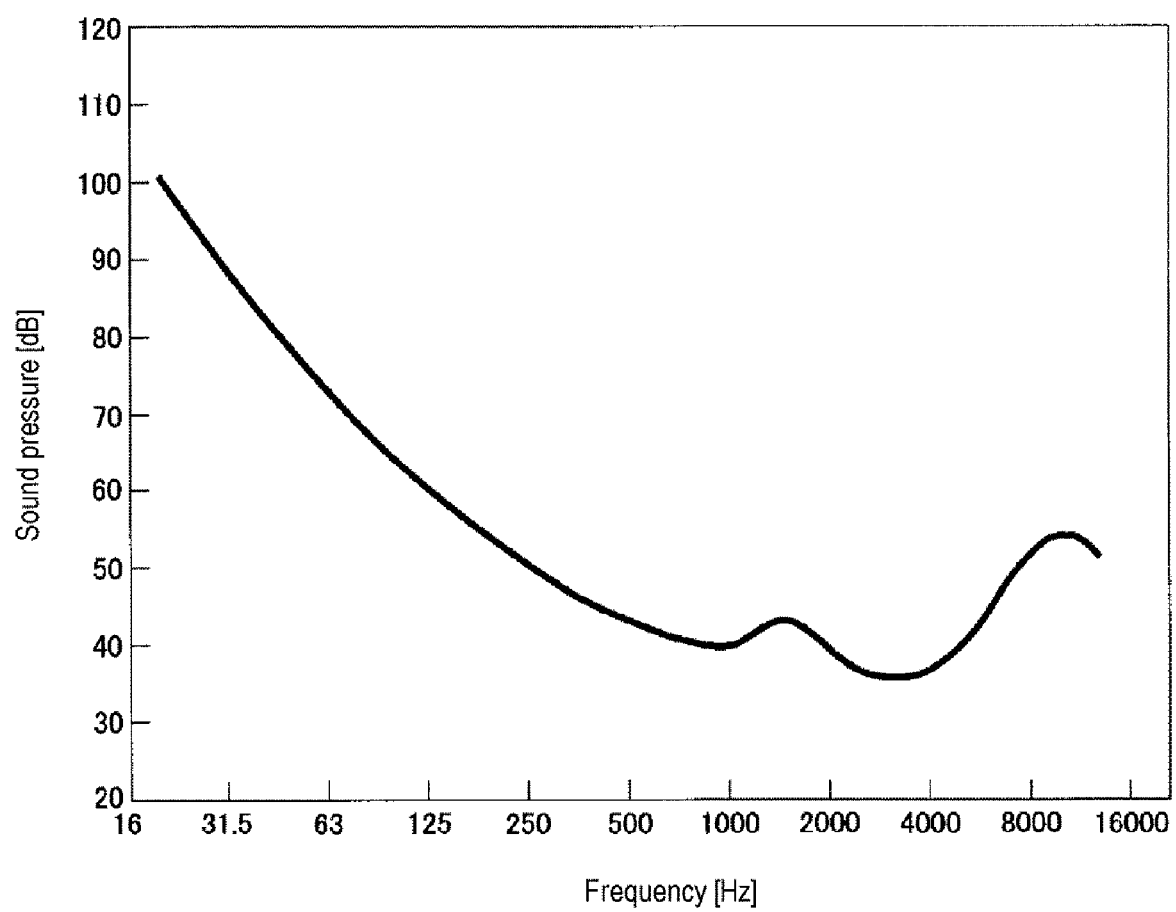
FIG. 5 is a view showing an equal loudness curve.

It is desirable that the predetermined period of time PT1 is 4 ms or longer, that is, the appearance frequency of the operation period is 250 Hz or lower. As can be seen from an equal loudness curve shown in FIG. 5, when the appearance frequency is 250 Hz or lower, it will be difficult for the frequency to be heard by humans. The equal loudness curve shown in FIG. 5 is an equal loudness curve newly standardized as ISO 226 in 2003. When the appearance frequency of the operation period is decreased, the pause period becomes longer, so that the efficiency of the switching power supply shown in FIG. 1 is increased, whereas a ripple voltage of the output voltage Vout of the switching power supply shown in FIG. 1 is increased. Therefore, the appearance frequency of the operation period may be set in consideration of the trade-off relationship between the efficiency of the switching power supply shown in FIG. 1 and the ripple voltage of the output voltage Vout of the switching power supply shown in FIG. 1.

In the switching power supply shown in FIG. 1, the predetermined period of time PT1 varies depending on the electrostatic capacitance of the capacitor C2. That is, the predetermined period of time PT1 can be adjusted by selecting the electrostatic capacitance of the capacitor C2.

Figure 6:
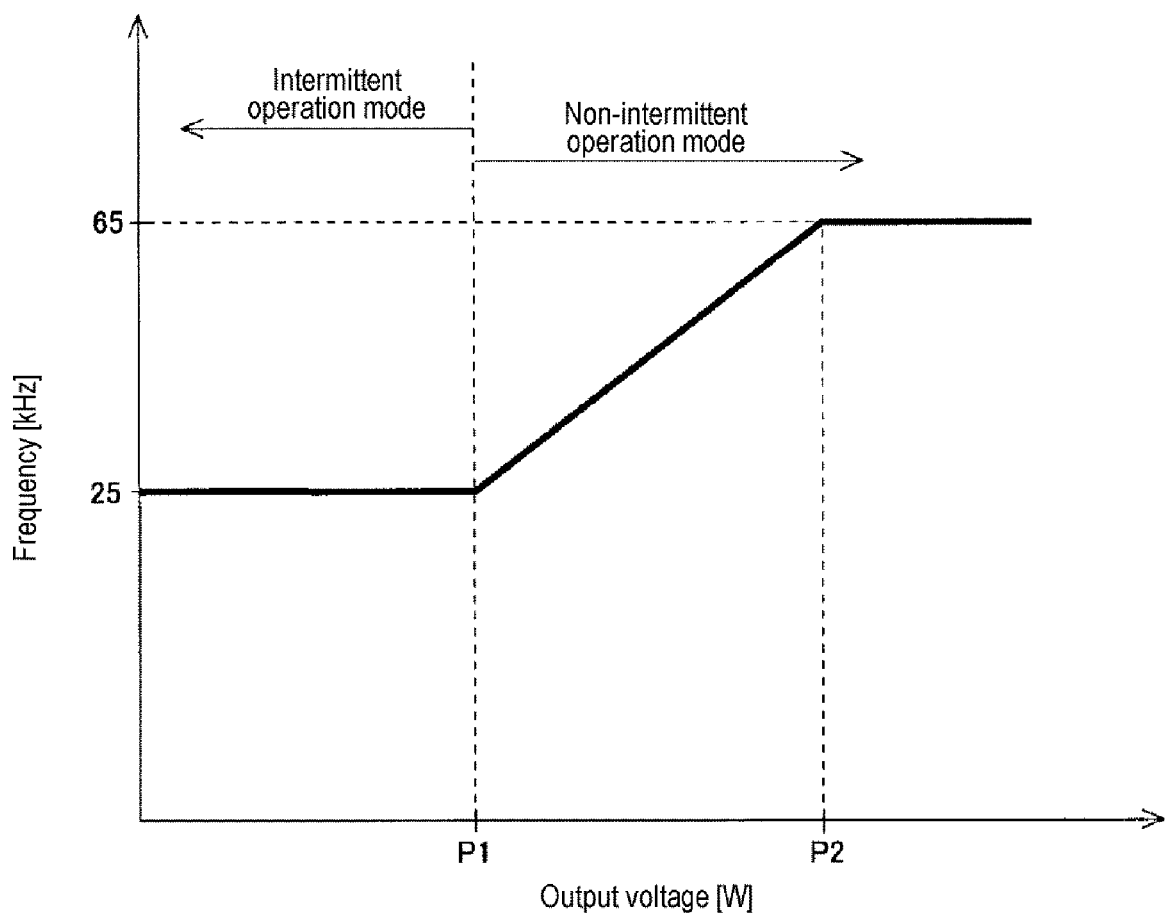
FIG. 6 is a view showing switching frequency characteristics.

As in the switching frequency characteristics shown in FIG. 6, the switching control IC 1 sets the switching frequency of the switching element Q1 to 25 kHz during the operation period of the intermittent operation mode. The switching frequency of the switching element Q1 during the operation period of the intermittent operation mode is not limited to 25 kHz, but is desirably higher than 20 kHz in order to avoid an audible range. In the example shown in FIG. 6, when the output power of the switching power supply shown in FIG. 1 is lower than P1[W], the intermittent operation mode is set.

In addition, as in the switching frequency characteristics shown in FIG. 6, when the output power of the switching power supply shown in FIG. 1 is not lower than P1[W] and not higher than P2[W] in a non-intermittent operation mode, the switching control IC 1 increases the switching frequency of the switching element Q1 as the output power of the switching power supply shown in FIG. 1 increases. When the output power of the switching power supply shown in FIG. 1 is higher than P2[W] in the non-intermittent operation mode, the switching control IC 1 sets the switching frequency of the switching element Q1 to 65 kHz. The maximum switching frequency of the switching element Q1 is not limited to 65 kHz, but is desirably 60 kHz or higher in order to suppress the peak current flowing through the secondary winding N2. The output power of the switching power supply shown in FIG. 1 depends on the peak current flowing through the primary winding N1. The peak current flowing through the primary winding N1 is determined by the feedback voltage Vfb. That is, the switching control IC 1 performs feedback control based on the feedback voltage Vfb so that the output voltage Vout becomes a desired voltage. In this feedback control, the switching control IC 1 changes the switching frequency of the switching element Q1 according to the value of the feedback voltage Vfb.

<3. Applications>

Figure 7:
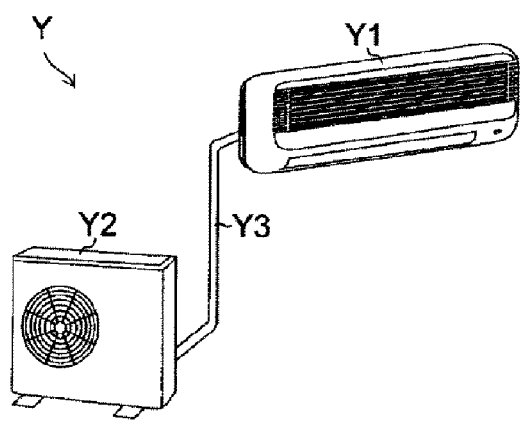
FIG. 7 is an external view showing a configuration example of an air conditioner.

Next, application examples of the switching power supply shown in FIG. 1 described above or the modification thereof will be described. FIG. 7 is an external view showing a configuration example of an air conditioner. The air conditioner Y of this configuration example includes an indoor unit Y1, an outdoor unit Y2, and a pipe Y3 connecting them. The indoor unit Y1 mainly contains an evaporator and an indoor fan, and the outdoor unit Y2 mainly contains a compressor, a condenser, an expansion valve, and an outdoor fan. The indoor unit Y1 also contains the switching power supply shown in FIG. 1 or a modification thereof.

In a cooling operation of the air conditioner Y, first, the compressor of the outdoor unit Y2 compresses a refrigerant into a high temperature and high pressure gas, and then the condenser of the outdoor unit Y2 dissipates heat to liquefy the refrigerant. At this time, in order to promote heat dissipation, wind is blown against the condenser by operating the outdoor fan, and accordingly, hot air blows out from the outdoor unit Y2. Next, the liquefied refrigerant is decompressed into a low temperature and low pressure liquid by the expansion valve of the outdoor unit Y2, which is then sent to the indoor unit Y1 via the pipe Y3 and vaporized by the evaporator of the indoor unit Y1. At that time, since the temperature of the evaporator becomes low due to the heat of vaporization of the refrigerant, cold air is sent out from the indoor unit Y1 into a room by operating the indoor fan to blow wind against the evaporator. The evaporated refrigerant is sent again to the outdoor unit Y2 via the pipe Y3, and then the same heat exchange processing as above is repeated.

In a heating operation of the air conditioner Y, the circulation direction of the refrigerant is reversed, and the roles of the evaporator of the indoor unit Y1 and the condenser of the outdoor unit Y2 are switched, but basically the same heat exchange processing as above is performed.

<4. Other Modifications>

Besides the above embodiments, the configuration of the present disclosure can be modified in various ways without departing from the spirit and scope of the present disclosure.

Figure 8:
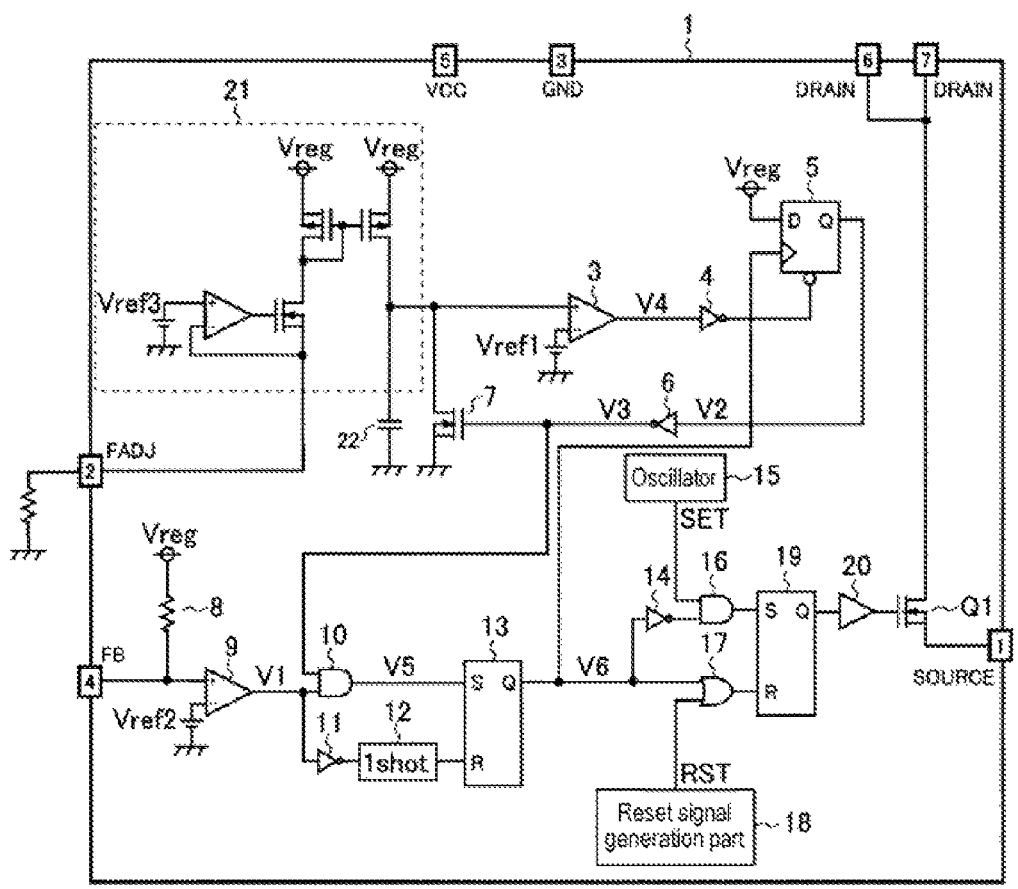
FIG. 8 is a view showing another configuration example of the switching control circuit.

In the switching power supply shown in FIG. 1, the switching control IC 1 having the configuration shown in FIG. 2 is used, but may be replaced with a switching control IC 1 having a configuration shown in FIG. 8. When the switching control IC 1 having the configuration shown in FIG. 8 is employed, the capacitor C2 is replaced by a resistor. The switching control IC 1 having the configuration shown in FIG. 8 additionally includes a current mirror circuit 21 and a capacitor 22 while removing the constant current source 2 from the switching control IC 1 having the configuration shown in FIG. 2. The current mirror circuit 21 supplies a first current to the capacitor 22 and a second current to a resistor connected to the second terminal of the switching control IC 1. The value of the second current is a value obtained by dividing the value of a third reference voltage Vref3 by the resistance value of the resistor connected to the second terminal of the switching control IC 1. The ratio of the value of the second current to the value of the first current is a predetermined value. When the switching control IC 1 having the configuration shown in FIG. 8 is employed, it is possible to adjust the predetermined period of time PT1 by selecting the resistance value of the resistor connected to the second terminal of the switching control IC 1.

Figure 9:
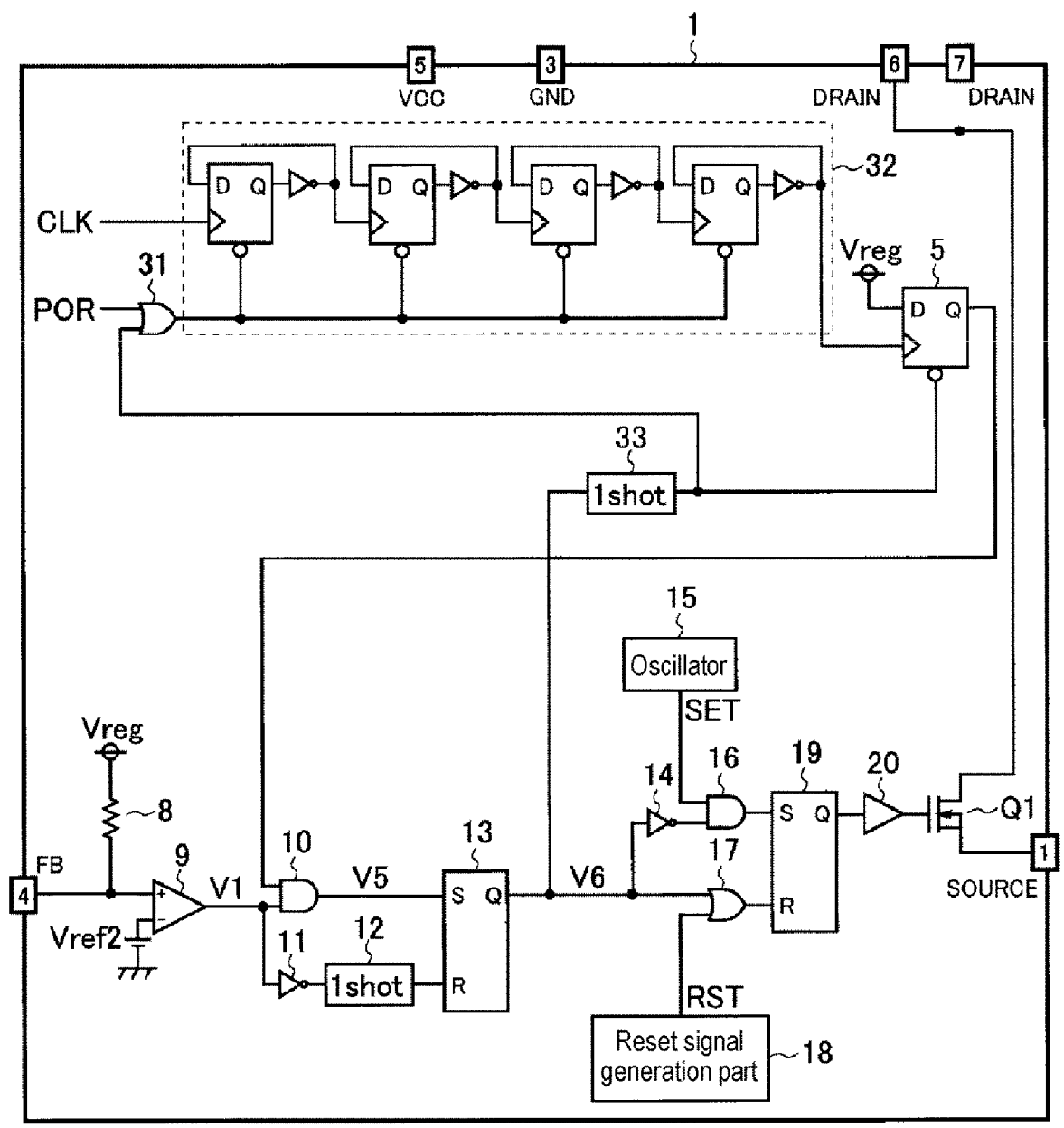
FIG. 9 is a view showing still another configuration example of the switching control circuit.

In the switching power supply shown in FIG. 1, the switching control IC 1 having the configuration shown in FIG. 2 is used, but may be replaced with a switching control IC 1 having a configuration shown in FIG. 9. When the switching control IC 1 having the configuration shown in FIG. 9 is employed, the capacitor C2 is unnecessary. The switching control IC 1 having the configuration shown in FIG. 9 additionally includes an OR gate 31, a counter 32, and a one-shot circuit 33 while removing the second terminal, the constant current source 2, the comparator 3, the NOT gate 4, the NOT gate 6, and the discharging switch 7 from the switching control IC 1 having the configuration shown in FIG. 2. A power-on reset signal POR supplied to the OR gate 31 and a clock signal CLK supplied to the counter 32 are generated inside the switching control IC 1. When the switching control IC 1 having the configuration shown in FIG. 9 is employed, the predetermined period of time PT1 is a fixed value.

The switching power supply shown in FIG. 1 is a power supply having a fly-back type converter, but may be a power supply having a different converter such as a buck type converter.

An air conditioner has been exemplified as an application of the switching power supply shown in FIG. 1 or a modification thereof, but the switching power supply shown in FIG. 1 or a modification thereof may be applied for other electric apparatuses such as a washing machine and a refrigerator.

According to the present disclosure in some embodiments, it is possible to provide a switching control circuit capable of reliably and sufficiently increasing efficiency at a light load.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The technical scope of the present disclosure is not described in the above embodiments but specified by the scope of the claims. The accompanying claims and their equivalents are intended to cover such forms or modifications as would fall within the scope and spirit of the disclosures.

What is claimed is:

1. A switching control circuit for use with a switching power supply, which is operable to generate an output voltage from an input voltage and that has a switching element, comprising:
    a driver configured to supply a voltage output to the switching element having an intermittent operation mode where an operation period in which the switching element is switched with a predetermined frequency during the operation period and a pause period in which the switching element is not switched during the pause period are repeated, wherein start of the operation period is triggered by an event;
    a prohibition part configured to prohibit starting a next operation period until a predetermined period of time elapses from a beginning of a current operation period, in the intermittent operation mode; and
    an oscillator configured to generate a set signal for driving the switching element, the set signal having the predetermined frequency,
    wherein the prohibition part is configured to prohibit starting of the next operation period by preventing the set signal from being used for driving the switching element until after the predetermined period of time has elapsed even if the event has reoccurred prior to elapse of the predetermined period of time.

2. The switching control circuit of claim 1, further including a constant current circuit configured to output a constant current to adjust a length of the predetermined period of time.

3. The switching control circuit of claim 1, wherein the predetermined period of time is 4 ms or longer.

4. The switching control circuit of claim 1, wherein a maximum switching frequency of the switching element is 60 kHz or higher.

5. The switching control circuit of claim 1, further comprising a terminal to which a passive element is externally connected,
wherein the predetermined period of time varies depending on a circuit constant of the passive element.

6. The switching control circuit of claim 5, further comprising a constant current source,
wherein the passive element is a capacitor charged with a constant current output from the constant current source.

7. The switching control circuit of claim 5, further comprising a capacitor and a current mirror circuit configured to supply a current to each of the capacitor and the passive element,
wherein the passive element is a resistor.

8. The switching control circuit of claim 6, wherein the predetermined period of time is a period of time from a beginning of charging the capacitor until a charging voltage of the capacitor reaches a predetermined value.

9. A switching power supply operable to generate an output voltage from an input voltage and having a switching element, the switching power supply comprising:
a switching control circuit configured to control switching of the switching element, wherein the switching control circuit comprises:
a driver configured to supply a voltage output to the switching element having an intermittent operation mode where an operation period in which the switching element is switched with a predetermined frequency during the operation period and a pause period in which the switching element is not switched during the pause period are repeated, wherein start of the operation period is triggered by an event;
a prohibition part configured to prohibit starting a next operation period until a predetermined period of time elapses from a beginning of a current operation period, in the intermittent operation mode; and
an oscillator configured to generate a set signal for driving the switching element, the set signal having the predetermined frequency,
wherein the prohibition part is configured to prohibit starting of the next operation period by preventing the set signal from being used for driving the switching element until after the predetermined period of time has elapsed even if the event has reoccurred prior to elapse of the predetermined period of time.

10. An electric apparatus comprising:
the switching power supply of claim 8.

11. A switching control circuit for use with a switching power supply which is operable to generate an output voltage from an input voltage, comprising:
a switching element;
a driver configured to supply a voltage output to the switching element having an intermittent operation mode where an operation period in which the switching element is switched with a predetermined frequency during the operation period and a pause period in which the switching element is not switched during the pause period are repeated, wherein start of the operation period is triggered by an event;
a prohibition part configured to prohibit starting a next operation period until a predetermined period of time elapses from a beginning of a current operation period, in the intermittent operation mode; and
an oscillator configured to generate a set signal for driving the switching element, the set signal having the predetermined frequency,
wherein the prohibition part is configured to prohibit starting of the next operation period by preventing the set signal from being used for driving the switching element until after the predetermined period of time has elapsed even if the event has reoccurred prior to elapse of the predetermined period of time.

* * * * *